May 31, 1966  A. L. INGALLS  3,253,499
OPTICAL SUPPORT ASSEMBLY
Filed June 6, 1963  2 Sheets-Sheet 1
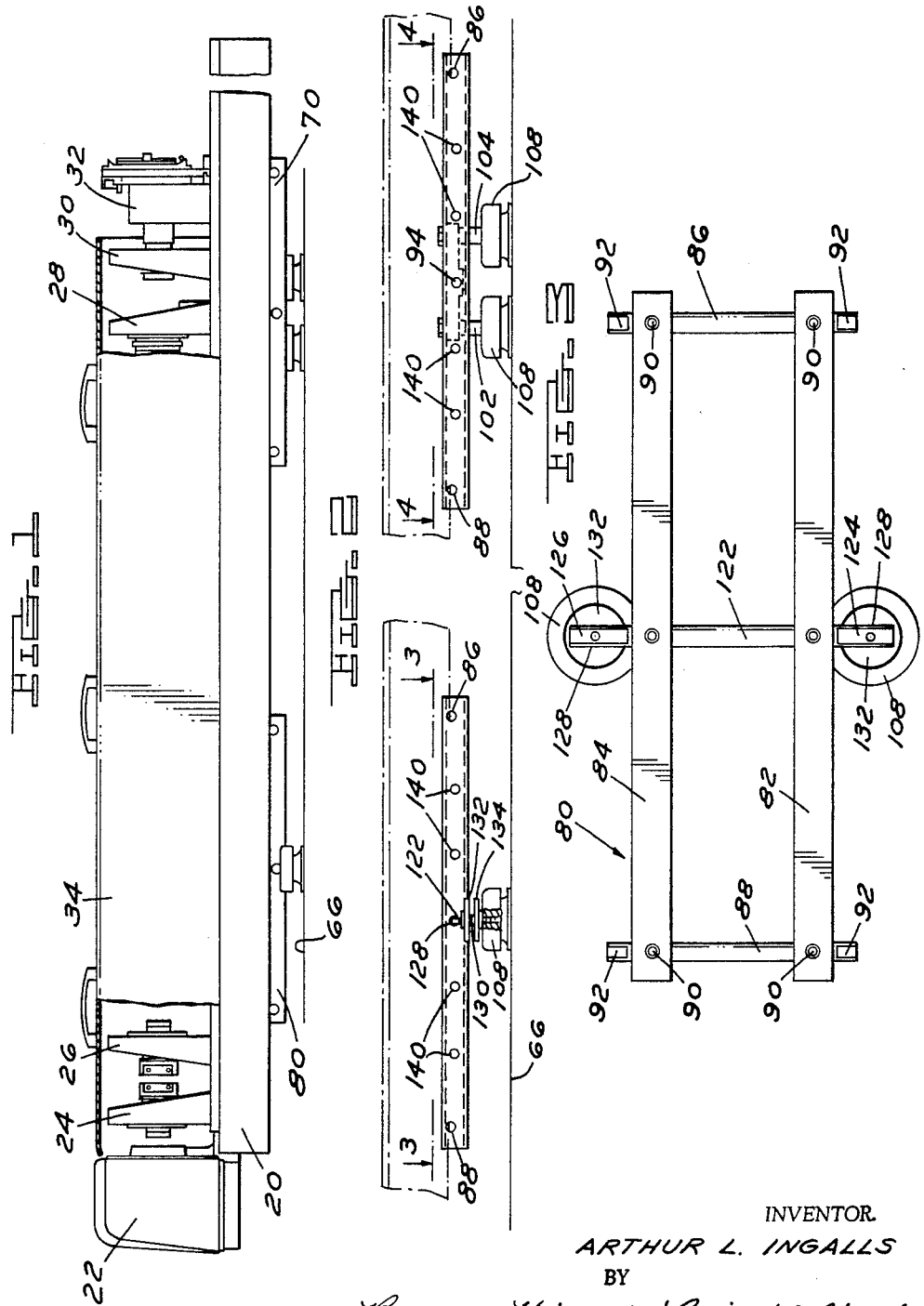
INVENTOR.
ARTHUR L. INGALLS
BY
Barnes, Kisselle, Raisch & Choate
ATTORNEYS

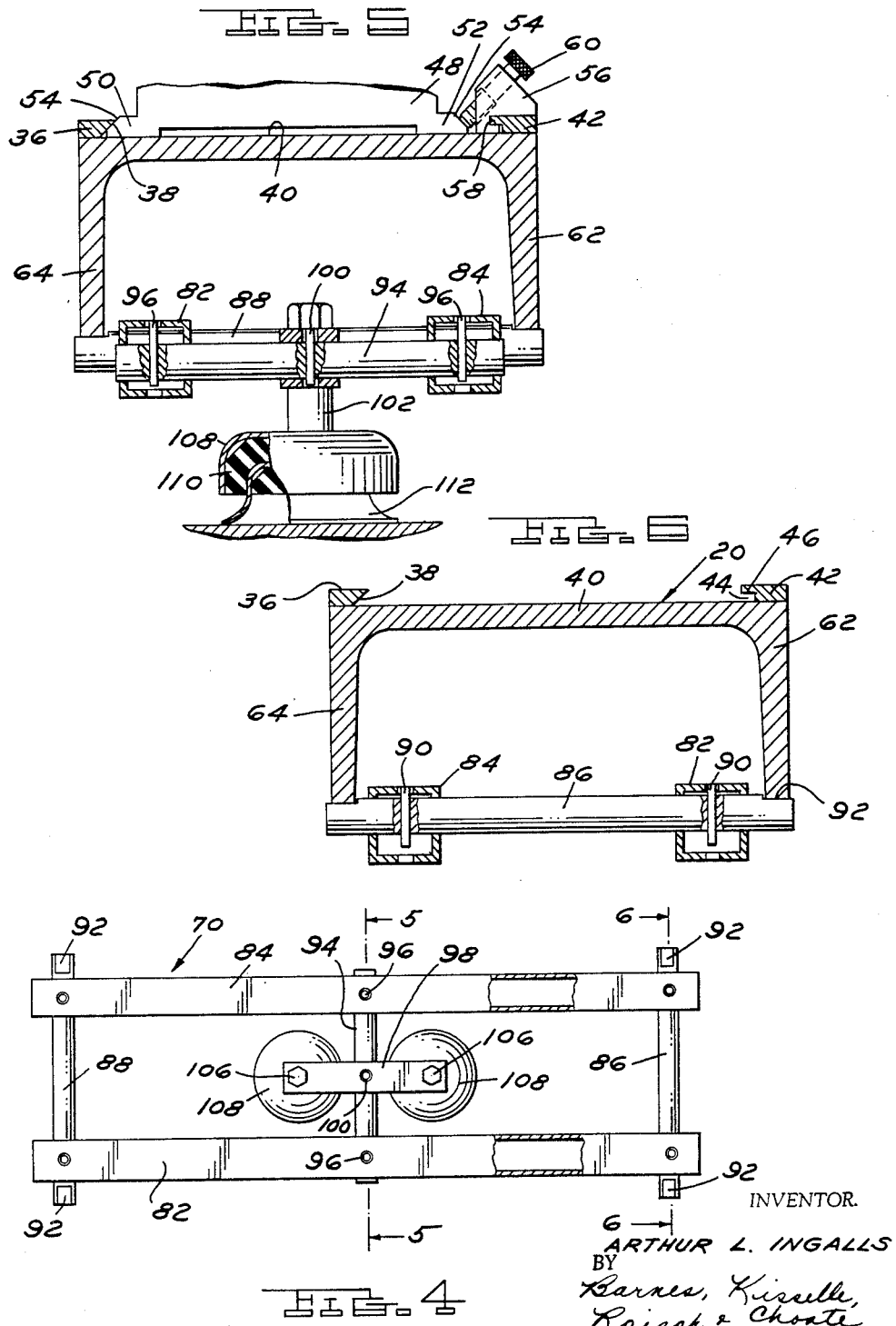

United States Patent Office 3,253,499
Patented May 31, 1966

3,253,499
OPTICAL SUPPORT ASSEMBLY
Arthur L. Ingalls, Ann Arbor, Mich., assignor to Conductron Corporation, Ann Arbor, Mich., a corporation of Delaware
Filed June 6, 1963, Ser. No. 286,025
11 Claims. (Cl. 88—1)

This invention relates to an optical system assembly for optical correlators or other optical systems and more particularly to a combination of an optical system and a support for such a system which eliminates, as much as is possible, variations due to vibration or lack of rigidity.

It is an object of the invention to provide an optical sytsem which includes a large number of aligned light transmitting devices such as lenses, variable slits, filters and the like to provide an elongate ray pattern. The ray system that is utilized to produce the results in an optical correlator or computer system of this kind is very sensitive and it is necessary to align devices very carefully and maintain their position with accuracy.

Since it is known that any load on a supporting structure will change the structure to some extent, it is an object of the present invention to provide a supporting structure for optical systems which are as independent of load distortion as possible. This is accomplished not by an attempt to render the necessary elongate support as rigid as possible but actually adopting a beam support relatively light in structure and supporting it in a way to prevent bending moment in any one area from affecting the requisite straightness of the beam.

Another object of the invention relates to a suspension mechanism which produces the desirable effect of a three-point suspension for a long beam or rail so that the device is extremely stable and not subject to vibration, rocking, bending, or torsion.

Other objects and features of the invention relating to details of construction and operation will be apparent in the following description and claims.

Drawings accompany the disclosure, and the various views thereof may be briefly described as:

FIGURE 1, a side view of a support assembly.
FIGURE 2, a side view of the assembly showing details of the parts.
FIGURE 3 a plan view taken on line 3—3 of FIGURE 2.
FIGURE 4, a sectional view on line 4—4 of FIGURE 2.
FIGURE 5, a sectional view on line 5—5 of FIGURE 4.
FIGURE 6, a sectional view on line 6—6 of FIGURE 4.

Referring to the drawings:

In FIGURE 1, a rail or beam structure 20 is shown extending the length of an optical system, said beam having a C-section as shown in FIGURE 6. On this beam is a lamp house assembly 22 to provide a light source with a series of optical devices loaded along the beam such as an objective assembly 24 and 26 at one end and an objective shutter assembly 28 and an objective assembly 30 used in conjunction with a reading device such as a recording camera assembly 32 at the other end. The various optical devices including lenses and slits used to control an elongate ray pattern in the system are generally covered by a cover housing 34 which can be a single piece shroud or split into a series of shrouds depending on the convenience of handling.

As shown in FIGURE 6, the beam assembly 20 has a narrow rail 36 fastened along one side having a chamfered edge to form a re-entrant groove 38 with the top of the beam. On the other side of the surface 40 of the beam is a rail strip 42 having a re-entrant groove 44 formed by a small flange projection 46. The various optical devices supported on the beam are each provided with a base 48 of FIGURE 5 having opposed foot portions 50 and 52 each having a 45° angle edge 54. On the left-hand side of the beam, as viewed in FIGURE 5, the foot portion engages the groove 38 and is locked under it and on the right-hand side a locking bracket or block 56 has a groove 58 which receives the flange 46 to interengage and lock against the rail 42. A screw 60 is threaded into the block 56 at a 45° angle so that the blunt end thereof engages the surface 54 on the right-hand side of block 48. Thus, a tightening of screw 60 in effect locks the foot portion 52 down while driving the block 56 into tight engagement with rail 42. The block 48 is thus firmly wedged into tight contact with the surface 40 of the beam which is preferably a ground surface and it is locked against motion by the combined effect of the rails 36 and 42 but readily removable by a loosening of screw 60 and shifting of block 56. The beam is a C-shaped beam having in cross-section two legs 62 and 64 which serve to support the beam through the mechanism to be described on any convenient supporting table 66.

There are two secondary supporting devices for the beam comprising a frame 70 at the right-hand end of FIGURE 1 and a frame 80 at the left-hand end. Each of these frames spans a substantial proportion of the beam length preferably about one-quarter of the length. Frame 70, as shown in FIGURE 4, is composed of two longitudinal tubular elements 82 and 84 having a square cross section as shown in FIGURE 6. These elements are transfixed at opposite ends by lateral rods 86 and 88, passing through the vertical walls of the tubes and loosely positioned relative thereto by roll pins 90. Each of these rods has a flat 92 ground on the upper surface, this flat being positioned to contact the lower edge of the sides 62 and 64 of the beam 20. The frame 70 is centrally supported by a third rod 94 which extends through the longitudinal tubes 82 and 84 and is again loosely related thereto by roll pins 96. Rod 94 is positioned below the rods 86, 88 in order that there will be no interference with the sides 62 and 64. Centrally of the rod 94 is a bar 98 which is spaced axially between and parallel to the tubes 82 and 84. This bar is drilled to receive the rod 94 which again is positioned against dislodgement by a roll pin 100. The bar 98 is supported at each end by a post 102 and 104, these posts each being bolted to the bar 98 by a bolt 106.

At the foot of each bolt 102 and 104 is a shock and vibration isolator mount device composed of a housing 108 which caps a body of rubber material 110 with an interposed footing portion 112. Thus, the side rails of the beam are supported at four points 92 on the frame 70, and the frame is able to pivot on the horizontal rod 86 to the degree necessary to compensate for any slight variations in the contact points. Accordingly, there is a solid support on the rods 86 and 88 carried down to the shock mounts 108.

At the other end of the structure, a similar frame 80 is shown having longitudinal tubes 82 and 84 with lateral cross rods 86 and 88 each having the ground flats 92 to contact the bottom edges of the sides of the beam. The cross piece at the middle of frame 80, however, is a rod 122 which extends laterally through the frame and beyond it a distance on each side in extending ends 124 and 126. The rod 122 is again positioned below rods 86, 88 to avoid interference. Into each of these extending ends projects a stud 128 having a threaded shank 130 on which is fastened a knurled nut 132. The stud is threaded into an insert in the shock mount 108 previously described. A nut 134 threaded on shank 130 of stud 128 serves as a jam nut to lock the parts. By rotation of the nut 132, the distance between the supporting surface 66 and the ends of the supporting rod 122 can be altered. This arrangement permits leveling of the beam 20 both lengthwise and laterally. Here again, it will be seen that the side edges of the beam are supported on the four flats 92 so that the beam has an extended lengthwise support at each end and this support has been narrowed down to the central support through rod 86 at one end and rod 122 at the other. Thus, the tendency of the beam 20 to sag under the loads applied to it will be reduced to a minimum and yet the stability of the device is insured through the three-point suspension composed of the two laterally spaced shock mounts 108 at the left end and the closely spaced, axially aligned shock mounts 108 at the right end.

It will be seen that the elongate beam for the mounting of optical devices which permit use of an elongate ray system has a multi-point suspension which reaches out to the load areas and prevents any localized load from creating a sag in the beam. The device is adaptable in that the multi-point assemblies can be readily shifted lengthwise to underlie the heaviest load areas. Generally, however, if X is the distance between rods 86, 88, of one frame, it should also be substantially the distance between rods 86 and 88 of adjacent frames, and ½X would be the distance beyond each frame to the end of the beam.

In the case of very long beams, the supporting frames in direct contact with the beam can be bridged by tertiary supporting frames each of which would then be supported by the central cross rods 94 and 122 to maintain the three-point suspension as described.

Again in the case of very heavy load concentration, it may be desirable to shift the rod 94 or 122 to a position away from center to equalize the load stress at each end. Holes 140 are provided for this adaptation.

Thus, the object is accomplished to distribute evenly the supporting points of the beam to avoid deflection, permitting a relatively light construction and moderate cross-section relative to length while maintaining straightness.

I claim:

1. In combination, an optical system utilizing an elongate ray pattern comprising:
   (a) a lamp source,
   (b) a plurality of aligned optical components and a reading device,
   (c) individual mounting means for each of said devices, and
   (d) a common mount for each of said individual mounting means comprising a unitary elongate beam on which said components can be supported and aligned in spaced relation, means to lock said individual mounting means on said beam, shield means to cover said components on said beam, and means to support said beam to minimize bending and misalignment comprising a plurality of independent supports each contacting said beam in a plurality of longitudinally and transversely spaced areas, each said last means being supported on a transverse pivot located between the longitudinally spaced areas, one of said pivots being supported for stability transversely of said beam.

2. In combination, an optical system comprising:
   (a) a plurality of optical components arranged in alignment to provide an elongate ray pattern,
   (b) mounting means for each of said components comprising an individual support body, and an elongate support for bearing said support bodies in spaced relation along its length comprising a unitary beam member, a plurality of supporting frames to contact said beam at a plurality of bearing points spaced longitudinally and laterally of said beam, and means supporting each of said frames on a horizontal pivot between the longitudinally spaced bearing points of said frames.

3. A supporting device for an optical correlator system utilizing an elongate ray pattern comprising:
   (a) a beam having a flat supporting surface and downwardly depending flanges,
   (b) a pair of supporting frames spaced from each other and longitudinally of said beam having a longitudinal span to cover a substantial length of said beam,
   (c) means at the ends of each of said frames to contact said depending flanges at opposite sides of said beam, and
   (d) means at the central portion of said frames to pivotally support said frames on a single horizontal transverse pivot.

4. A supporting device as defined in claim 3 in which means for supporting one of said frames at one end of said beam comprises mounting elements spaced transversely of the beam and the means for supporting the other of said frames at the other end of said beam comprises mounting elements spaced longitudinally of said beam.

5. A support as defined in claim 3 in which said supporting frames comprise a pair of parallel members extending longitudinally of said beam, cross-pieces loosely and pivotally related for a predetermined degree of rotational movement relative to said longitudinal members, said cross members spanning the distance between and contacting the depending flanges of said beam, and a cross member for carrying the load of each said frames and said beam positioned centrally of said frame spaced downwardly from said end-cross members and having a limited pivotal relationship relative to said longitudinal members.

6. A device as defined in claim 3 in which the supporting frame at each end of said beam comprises a pair of longitudinally extending members parallel to each other and to the axis of said beam, transverse members to contact said beam at each end of said longitudinal members having a loose rotational relationship to said longitudinal members, and the means to support each said frame at the central portion of said frames comprises at the frame a cross member spanning the distance between said longitudinal members, a supporting bar parallel to said longitudinal members positioned to support said central cross member of one of said frames and having at each end a supporting surface contact mount transversely central of said beam, and the central supporting member at the other of said frames comprises a cross member spanning the distance between said longitudinal members and rotationally related thereto, said last cross member extending transversely outside each of said longitudinal members, and a mounting device at each end of said last cross member spaced laterally of said beam.

7. A supporting device for a series of aligned devices needing accurate and positive location comprising:
   (a) a beam having a supporting surface,
   (b) secondary supporting means spaced from each other and spaced longitudinally of said beam having a longitudinal span to cover a susbtantial length of said beam, each of said secondary supporting means having means at each end thereof to contact said beam at longitudinally and laterally spaced points, and
   (c) means centrally of each of said secondary supporting means pivotally mounting said means on an axis transverse to said beam.

8. A supporting device as defined in claim 7 in which one of said secondary supporting means has means for supporting it on a surface, said means comprising spaced mounts located transversely of said beam, and the other of said secondary supporting means has means for supporting it on a surface, said means comprising spaced mounts approximately on the axis of said beam.

9. A supporting device for a series of aligned devices requiring accurate and positive location comprising:

(a) a pair of spaced parallel mounts,
(b) elongate supporting members each supported in longitudinally spaced relation to each other and centrally thereof by one of said parallel mounts, and
(c) an elongate beam supported at four longitudinally spaced points adjacent the respective ends of said elongate supporting members.

10. A device as defined in claim 9 in which each of said elongate supporting members comprises a frame formed of two parallel longitudinal members parallel to the axis of said beam, means transversely associating said members, and means pivotally mounting said longitudinal members on an axis transverse to said beam on said respective spaced, parallel mounts.

11. A device as defined in claim 9 in which said beam has a flat surface thereon, re-entrant grooves formed at each side of said surface, and clamping mounts for said beam comprising mounting blocks having opposed foot portions to co-operate with said grooves, one of said foot portions engaging a groove on one side of said beam, and a locating block having a portion to lock in said other re-entrant groove and means on said locating block to contact said other foot portion to lock said mounting blocks firmly on said beam.

No references cited.

JEWELL H. PEDERSEN, *Primary Examiner.*

D. R. STEVENS, *Assistant Examiner.*